United States Patent
Hirota (10) Patent No.: US 9,678,391 B2
(45) Date of Patent: Jun. 13, 2017

(54) LIQUID CRYSTAL DISPLAY DEVICE (71) Applicant: Japan Display Inc., Minato-ku (JP)

(72) Inventor: Takenori Hirota, Tokyo (JP)

(73) Assignee: Japan Display Inc., Minato-ku (JP)

(*) Notice: Subject to any disclaimer, the term of this patent is extended or adjusted under 35 U.S.C. 154(b) by 76 days.

(21) Appl. No.: 14/605,256

(22) Filed: Jan. 26, 2015

(65) Prior Publication Data
US 2015/0212373 A1    Jul. 30, 2015

(30) Foreign Application Priority Data

Jan. 28, 2014 (JP) ................. 2014-013755

(51) Int. Cl.
*G02F 1/1337* (2006.01)
*G02F 1/1343* (2006.01)
*G02F 1/1368* (2006.01)

(52) U.S. Cl.
CPC .. *G02F 1/133788* (2013.01); *G02F 1/133711* (2013.01); *G02F 2001/133773* (2013.01); *G02F 2001/133776* (2013.01)

(58) Field of Classification Search
CPC ......... G02F 2001/133773; G02F 2001/133776
See application file for complete search history.

(56) References Cited

U.S. PATENT DOCUMENTS

2010/0066961 A1   3/2010  Matsui et al.
2012/0268702 A1*  10/2012 Imanishi ............. G02F 1/13394
                                                  349/124

FOREIGN PATENT DOCUMENTS

JP      10-39308       2/1998
JP      2010-72011     4/2010

* cited by examiner

*Primary Examiner* — Nimeshkumar Patel
*Assistant Examiner* — Jacob R Stern
(74) *Attorney, Agent, or Firm* — Oblon, McClelland, Maier & Neustadt, L.L.P.

(57) ABSTRACT

In a liquid crystal display device, a TFT substrate and a counter substrate are bonded by a sealing material, with a liquid crystal interposed between the two substrates. An alignment film has a two-layer structure of a lower alignment film not subjected to photo alignment treatment and an upper alignment film subjected to photo alignment treatment and contacting the liquid crystal. A hollow with an increased film thickness is formed in an end portion of the lower alignment film. An end portion of the upper alignment film is determined by the hollow of the lower alignment film. The material, process conditions, or other conditions of the lower alignment film for easy control of outer end dimensions can be selected to easily control the profile of the alignment film as a whole. Thus, it is possible to avoid the reduction of reliability due to the reduction of the bonding strength between the sealing material and the alignment film.

8 Claims, 11 Drawing Sheets

LIQUID CRYSTAL DISPLAY DEVICE

CLAIM OF PRIORITY

The present application claims priority from Japanese Patent Application JP 2014-13755 filed on Jan. 28, 2014, the content of which is hereby incorporated by reference into this application.

BACKGROUND

The present invention relates to a liquid crystal display device, and more particularly to, a liquid crystal display device including a liquid crystal display panel with alignment control capability added to an alignment film by irradiation of light.

A display device includes a TFT substrate in which pixels each having a pixel electrode, a thin film transistor (TFT), and the like are arranged in a matrix form. Further, a counter substrate is disposed opposite the TFT substrate, in which color filters and the like are formed at positions corresponding to the pixel electrodes of the TFT substrate. Further, a liquid crystal is interposed between the TFT substrate and the counter substrate. Then, an image is formed by controlling the transmittance of light through each pixel by the liquid crystal molecules.

Liquid crystal display devices are flat and lightweight, and thus have been used for a variety of applications from large display devices such as TV, to smaller devices such as mobile phones and digital still cameras (DSC). At the same time, the viewing angle characteristics are a problem for the liquid crystal display device. The viewing angle characteristics are a phenomenon that the brightness changes or the chromaticity changes between when the screen is viewed from the front and when it is viewed in an oblique direction. The viewing angle characteristics are excellent in the In Plane Switching (IPS) mode for driving liquid crystal molecules by an electric field in the horizontal direction.

There are two methods of providing an alignment treatment, namely, alignment control capability to an alignment film used in a liquid crystal display device. One is the so-called rubbing method for rubbing the alignment film with cloth or other materials. The other one is a photo alignment method for giving uniaxial anisotropy to the alignment film by irradiating the particular alignment film with polarized ultraviolet light. The IPS mode does not require the so-called pretilt angle, and thus to which the photo alignment treatment can be applied.

Japanese Unexamined Patent Application Publication No. 2010-72011 describes a configuration of alignment film with a two-layer structure to increase the uniaxial anisotropy of a photoaligned film in order to increase the alignment stability. In other words, a polyimide with polyamide acid ester, in which the number average molecular weight of the alignment film is large with excellent alignment stability, is formed as a precursor on the upper layer. However, the resistivity of the particular alignment film is large, so that electrical charges are easily accumulated in the alignment film and a residual image is likely to occur. Thus, the polyimide with polyamide acid capable of reducing the resistivity as a precursor is formed in the lower layer in order to prevent the charges from the alignment film from being accumulated.

Japanese Unexamined Patent Application Publication No. Hei 10(1998)-39308 describes a configuration of alignment film in the existing twisted nematic (TN) mode, in which the lower layer is formed by an alignment film applied with polyamide acid having excellent coating property as a precursor, and the upper layer is formed by an alignment film applied with a soluble polyimide in which charges could not be easily accumulated, in order to prevent the accumulation of charges.

SUMMARY

Photo alignment is a technique to form a uniaxial anisotropy by breaking the main chain of polyimide of an alignment film in a specific direction by polarized ultraviolet light. However, the main chain of the photoaligned film is broken by ultraviolet light in the specific direction, so that the strength of the film is reduced. The liquid crystal display panel has a structure in which a TFT substrate and a counter substrate are bonded by a sealing material around the periphery with liquid crystal filled between the two substrates. If the film strength of the alignment film is weak, the bonding strength with the sealing material around the periphery is reduced. As a result, the reliability of the liquid crystal display panel is reduced.

On the other hand, in order to increase the stability of the alignment film and to prevent charges from being accumulated in the alignment film, as descried in Japanese Unexamined Patent Application Publication No. 2010-72011, there is known a structure in which the lower layer is formed of polyamide acid and the upper layer is formed of polyamide acid ester. Note that, in the present specification, "the lower layer is formed of polyamide acid" means that "it is formed of polyamide acid as a precursor". Or "the upper layer is formed of polyamide acid ester" means that "it is formed of polyamide acid ester as a precursor".

The following method has been used as a method of forming such an alignment film. In other words, a mixture of polyamide acid and polyamide acid ester is applied to the substrate. Then, a layer separation occurs due to the difference in the number average molecular weight. As a result, there is formed a film in which the polyamide acid, which is compatible with the substrate side, forms the lower layer and the polyamide acid ester forms the upper layer. Then, the film is dried and baked to form a two-layer alignment film.

In this case, of the two alignment films, the alignment film formed of polyamide acid ester in the upper layer is the one whose main chain is broken in the specific direction by being subjected to photo alignment to form the uniaxial anisotropy. In other words, the material that is bonded to the sealing material in the seal portion is the polyamide acid ester. As described above, the main chain in the specific direction is broken in the upper alignment film, so that the mechanical strength of the upper alignment film is weak. As a result, there is a problem in the adhesiveness of the seal portion.

Thus, it has been necessary to control so that the alignment film is not formed to the seal portion while completely covering the display area. However, in particular in medium and small sized liquid crystal display devices, the demand for the so-called narrow frame has increased. In other words, it is desired to increase the area of the display area as much as possible, while keeping the profile of the liquid crystal display panel to a certain size.

Figure 11:
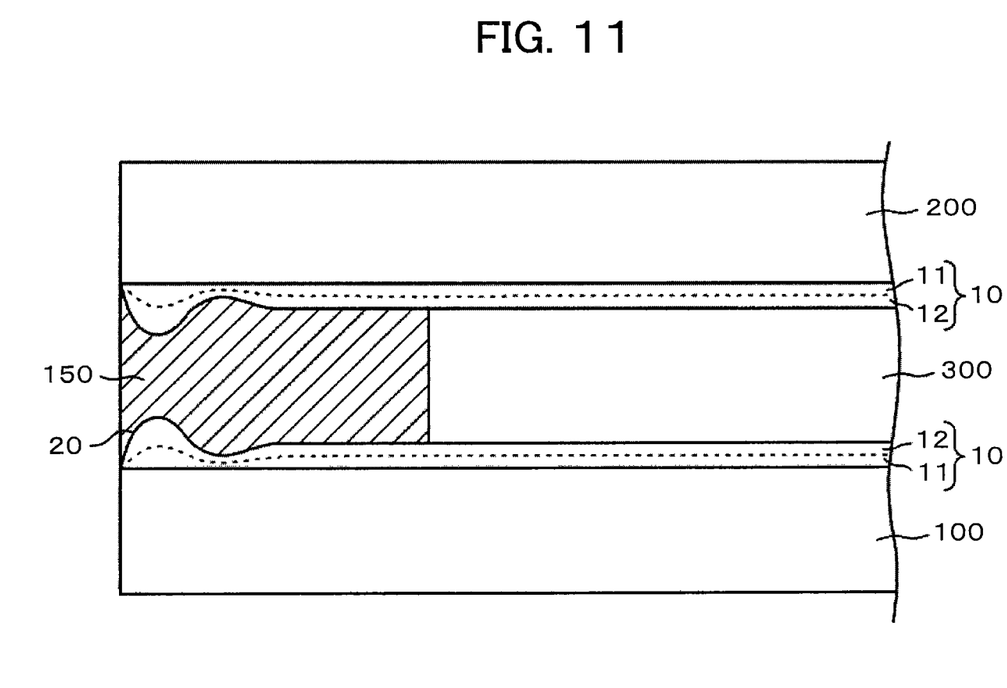
FIG. 11 is a cross-sectional view showing the conventional example.

In this case, the gap between the end portion of the display area and the inner end portion of the sealing material is reduced, and there is also a design in which the sealing material and the alignment film partially overlap with each other. However, it is difficult to control the end portion of the alignment film, so that the alignment film may be applied to extend to the end portion as shown in FIG. 11. In FIG. 11, the components formed in the TFT substrate such as the TFT, scanning lines, and video signal lines are omitted. Also, the color filters and the like formed in the counter substrate are omitted.

In FIG. 11, the alignment film on the substrate is formed in the following manner. When a mixed solution of polyamide acid ester and polyamide acid is applied on the substrate, a layer separation occurs into a lower layer of polyamide acid and an upper layer of polyamide acid ester. There is no clear boundary between the polyamide acid and the polyamide acid ester, so that the boundary is shown by the dotted lines in FIG. 11. Then, the alignment film is dried and baked to form polyimide. In FIG. 11, a raised portion called hollow is formed in an end portion of the alignment film.

In FIG. 11, the alignment film is formed to the end portion of the substrate. Even if the structure is such that the end portion of the alignment film is present in the middle of the sealing material so that the alignment film and the sealing material do not directly contact in the design, it is difficult to control the end portion of the alignment film. For this reason, the alignment film often reaches the end portion of the substrate as shown in FIG. 11. In the structure shown in FIG. 11, the upper layer of the alignment film and the sealing material contact each other in the full width of the sealing material. Thus, the bonding strength between the sealing material and the alignment film may not be sufficiently ensured.

In other words, in the case in FIG. 11, the sealing material is only bonded to the upper alignment film with weak mechanical strength, so that the bonding strength in the seal portion is reduced. As a result, the reliability of the liquid crystal display panel is reduced. It is desirable in the present invention to ensure the bonding reliability in the seal portion in the IPS mode using a photoaligned film.

The present invention is to overcome the above problem. Specific aspects are as follows.

(1) There is provided a liquid crystal display device including: a TFT substrate having a display area with pixels arranged in a matrix form, each pixel having a pixel electrode and a TFT, in which an alignment film is formed; a counter substrate disposed opposite the TFT substrate; and a liquid crystal interposed between the TFT substrate and the counter substrate. The alignment film is formed by a lower alignment film and an upper alignment film that is formed on the lower alignment film and brought into contact with the liquid crystal. The upper alignment film is subjected to photo alignment treatment. The lower alignment film is not subjected to the alignment treatment. Then, a hollow with an increased film thickness is formed in an end portion of the lower alignment film. An end portion of the upper alignment film is determined by the hollow of the lower alignment film.

(2) The liquid crystal display device described in (1), wherein the end portion of the lower alignment film is present between the display area and the sealing material.

(3) The liquid crystal display device described in (1), wherein the end portion of the lower alignment film is present between outer and inner ends of the sealing material.

(4) The liquid crystal display device described in (1), wherein the end portion of the lower alignment film is formed to an end portion of the TFT substrate or the counter substrate.

(5) The liquid crystal display device described in (1), wherein the lower alignment film is formed on a film in which irregularities are formed due to a film formed below the lower alignment film.

(6) The liquid crystal display device according to (1), wherein the lower alignment film does not contribute to the alignment of the liquid crystal.

(7) There is provided a liquid crystal display device including: a TFT substrate having a display area with pixels arranged in a matrix form, each pixel having a pixel electrode and a TFT, in which an alignment film is formed; a counter substrate disposed opposite the TFT substrate; and a liquid crystal interposed between the TFT substrate and the counter substrate. The alignment film is formed by a lower alignment film and by an upper alignment film formed on the lower alignment film and contacting the liquid crystal. The upper layer film is formed by a first alignment film contacting the lower alignment film and a second alignment film contacting the liquid crystal. The second alignment film of the upper alignment film is subjected to photo alignment treatment. The first alignment film of the upper alignment film is not subjected to the alignment treatment. The lower alignment film is not subjected to the alignment treatment. Then, a hollow with an increased film thickness is formed in an end portion of the lower alignment film. An end portion of the upper alignment film is determined by the hollow of the lower alignment film.

(8) The liquid crystal display device described in (7), wherein the material of the second alignment film of the upper alignment film has a concentration gradient in the film thickness direction of the upper alignment film.

According to the present invention, in an IPS mode liquid crystal display device using photo alignment, an alignment film is formed in such a manner that the lower layer of the alignment film, which is not subjected to an alignment treatment, is first applied, and then the upper layer of the alignment film, which is subjected to the alignment treatment by ultraviolet light, is applied. A raised portion, namely, a hollow in the vicinity of the lower alignment film is used as a dam of the upper alignment film. Thus, it is easy to control the profile of the upper alignment film, so that the reliability of the seal portion can be increased. Further, even if the lower alignment film reaches the end portion of the substrate, the hollow formed in the end portion of the lower alignment film is brought into contact with the sealing material in the end portion of the substrate. In this way, it is possible to ensure a minimum bonding strength.

DETAILED DESCRIPTION

Figure 8:
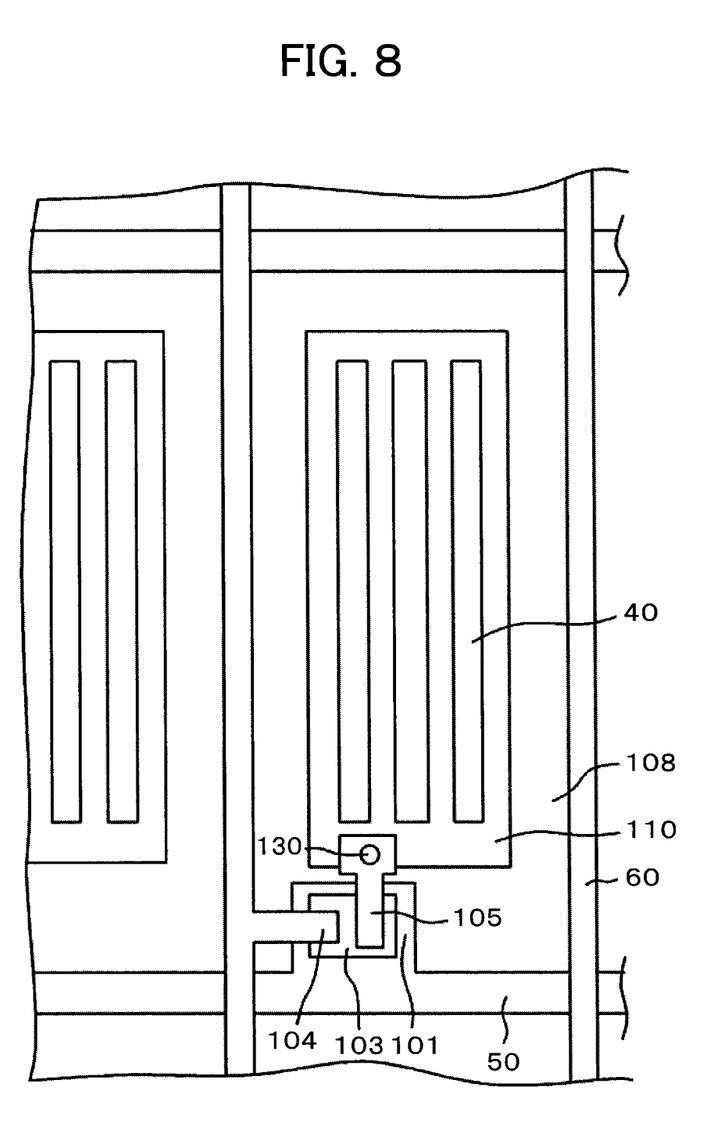
FIG. 8 is a plan view of an IPS mode liquid crystal display device to which the present invention is applied.
Figure 9:
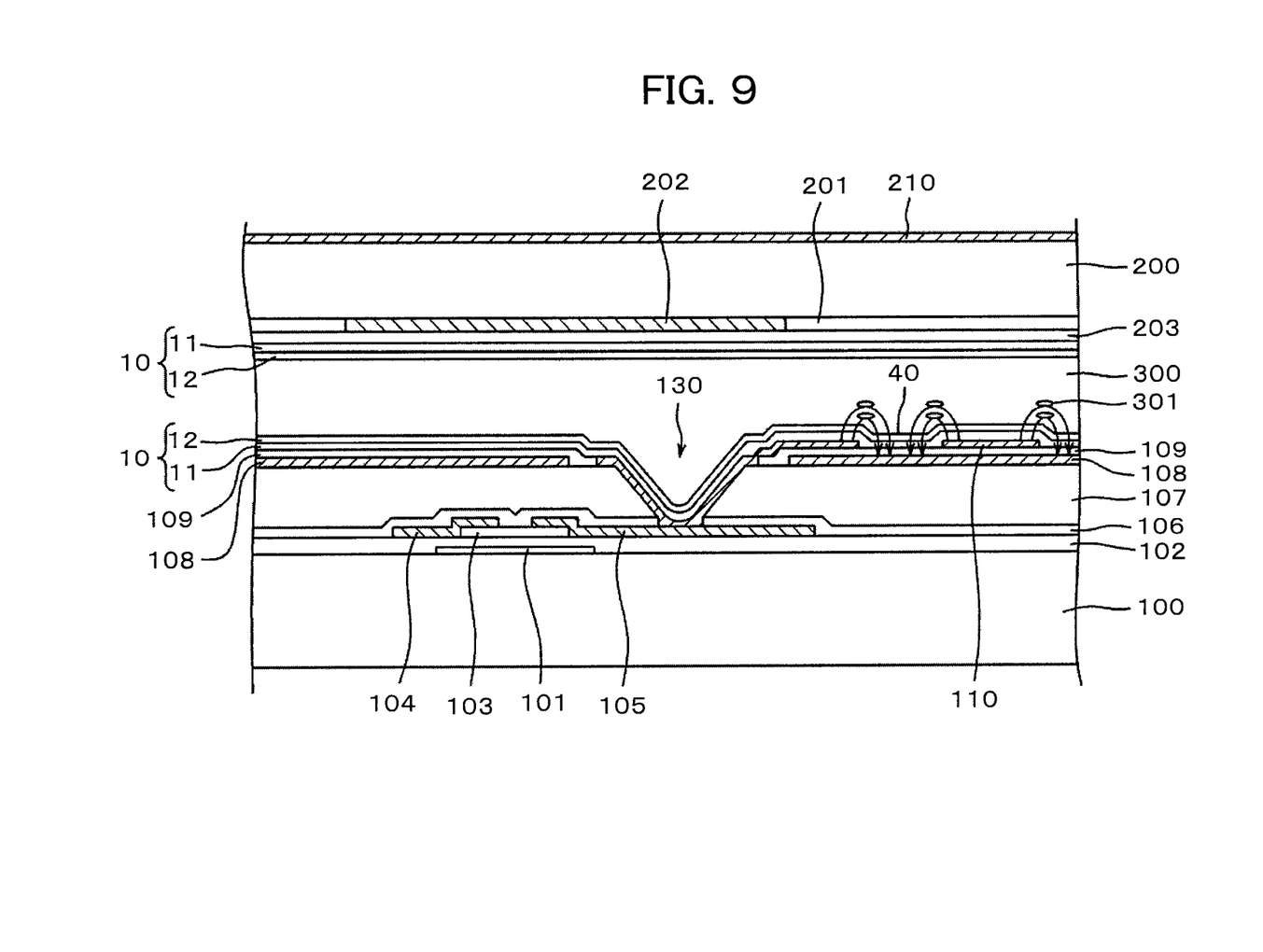
FIG. 9 is a cross-sectional view of the IPS mode liquid crystal display device to which the present invention is applied.

Before providing a detailed description of an alignment film of the present invention, the structure of an IPS mode liquid crystal display to which the present invention is applied will be described by using FIGS. 8 and 9. There are various types of IPS systems, and FIGS. 8 and 9 are an example of these systems. However, the present invention can also be applied to other types of liquid crystal display devices using photo alignment.

FIG. 8 is a plan view of the pixel structure according to the present invention, and FIG. 9 is a cross-sectional view of the pixel portion. In FIG. 8, each scanning line 50 extends in the horizontal direction and is arranged in the vertical direction at a predetermined pitch. Each video signal line 60 extends in the vertical direction and is arranged in the horizontal direction at a predetermined pitch. Then, a TFT, a pixel electrode 110, and a common electrode 108 are present in the pixel.

Figure 3:
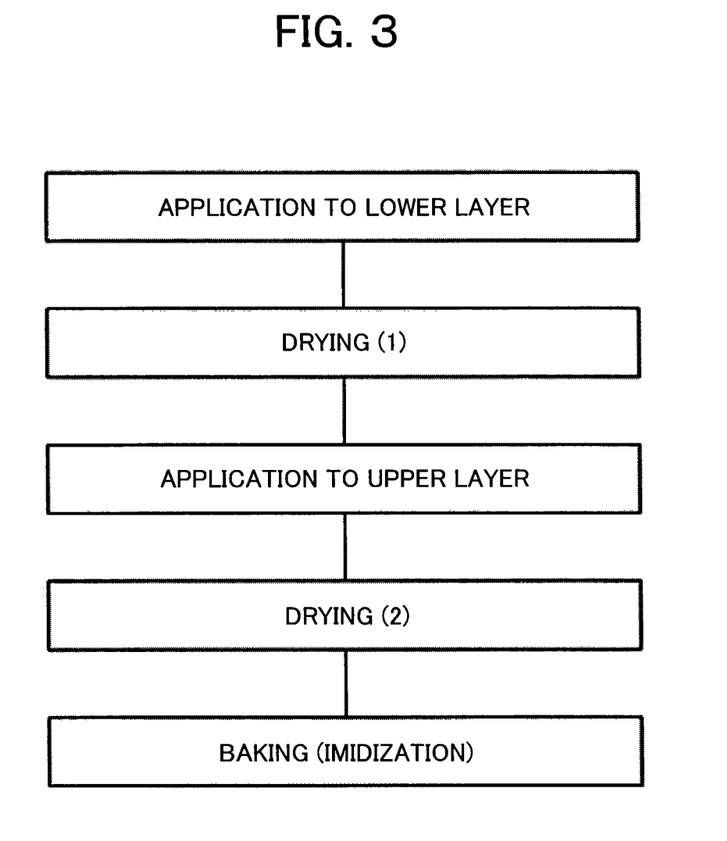
FIG. 3 is a flow chart showing the method of forming the alignment film according to the present invention.

In FIG. 3, a semiconductor layer 103 is formed on a gate electrode 101 branching out from the scanning line 50, through a gate insulating film. A drain electrode 104 branching out from the video signal line 60 is formed on the semiconductor layer 103. Further, a source electrode 105 is formed opposite the drain electrode 104 also on the semiconductor layer 103. The region between the drain electrode 104 and the source electrode 105 is a TFT channel portion. The source electrode 104 is electrically coupled to the pixel electrode 110 through a through hole 130 to supply a video signal to the pixel electrode 110. The names of the drain electrode and the source electrode may be reversed as well.

The common electrode 108 is formed in a planar shape below the pixel electrode 110 as described in FIG. 9. When a signal voltage is applied to the pixel electrode 110, as shown in FIG. 9, the electric lines of force pass through a liquid crystal layer 300 and reach the common electrode 108 through a slit 40 of the pixel electrode 110 and through the outside of the pixel electrode 110. The liquid crystal is rotated by the horizontal component of the electric lines of force to control the transmittance of the liquid crystal layer.

FIG. 9 is a cross-sectional view of the pixel portion. In FIG. 9, the gate electrode 101 is formed on the TFT substrate 100 that is formed of glass. Then, the gate insulating film 102 is formed on the TFT substrate 100 so as to cover the gate electrode 101. A semiconductor layer 103 is formed on the gate insulating film 102 above the gate electrode 101.

The semiconductor layer 103 is formed of a-Si. The semiconductor layer 103 is coupled to the drain electrode 104 and the source electrode 105 through n+a-Si. An inorganic passivation film 106 is formed so as to cover the semiconductor layer 103, the drain electrode 104, and the source electrode 105. Then, an organic passivation film 107 that also functions as a flattening film is formed on the inorganic passivation film 106. The organic passivation film 107 is formed thick with a thickness in the range of 1 to 3 μm.

A common electrode 108 is formed of ITO in a planner shape on the organic passivation film 107. An interlayer insulating film 109 is formed so as to cover the common electrode 108. Then, a pixel electrode 110 with a slit 40 is formed on the interlayer insulating film 109. The pixel electrode 110 is coupled to the source electrode 105 through the through hole 130. Then, an alignment film 113 is formed so as to cover the pixel electrode 110 in order to initially align the liquid crystal. In the present invention, an alignment film 10 includes an upper alignment film 12 subjected to photo alignment treatment and contacting the liquid crystal layer 300, and a lower alignment film 11 not subjected to the alignment treatment. The upper alignment film 12 is formed, for example, of polyamide acid ester. The lower alignment film 11 is formed, for example, of polyamide acid. In the present invention, the lower alignment film 11 and the upper alignment film 12 are separately applied, so that there is a boundary between the upper alignment film 12 and the lower alignment film 11.

In FIG. 9, when a video signal is applied to the pixel electrode 110, electric lines of force are generated between the pixel electrode 110 and the common electrode 108 as shown in the figure. Then, each liquid crystal molecule 301 is rotated by the horizontal component of the electric lines of force to control the light from the backlight.

The counter substrate 200 is disposed opposite the TFT substrate 100 with a liquid crystal layer 300 interposed therebetween. Each color filter 201 is formed at a position corresponding to the pixel electrode 110 on the inside of the counter substrate 200. Then, a black matrix 202 is formed between the color filters 201. An overcoat film 203 is formed so as to cover the color filters 201 and the black matrix 202. Then, the alignment film 10 is formed on the overcoat film 203.

Similarly to the alignment film on the TFT substrate side, the alignment film 10 on the side of the counter substrate 200 includes the lower alignment film 11 not subjected to the alignment treatment as well as the upper layer subjected to the photo alignment treatment. Note that the common electrode is not formed on the side of the counter substrate 200, so that an external conductive film 210 is formed of ITO on the outside of the counter substrate 200 in order to shield noise from the outside.

FIG. 2 is a case of a so-called bottom gate type TFT. However, there is also the case of a top gate type in which the gate electrode 102 is formed on the semiconductor layer 103 through the gate insulating film. Further, the material of the semiconductor layer 103 is not limited to a-Si. The semiconductor layer 103 may also be formed of poly-Si. Further, the present invention may be applied to a structure in which the vertical relationship between the pixel electrode and the common electrode is reversed, in which the color filters are formed on the TFT substrate. In addition, the pixel electrode may include one electrode.

Hereinafter, the present invention will be described in detail with reference to exemplary embodiments.

First Embodiment

Figure 1:
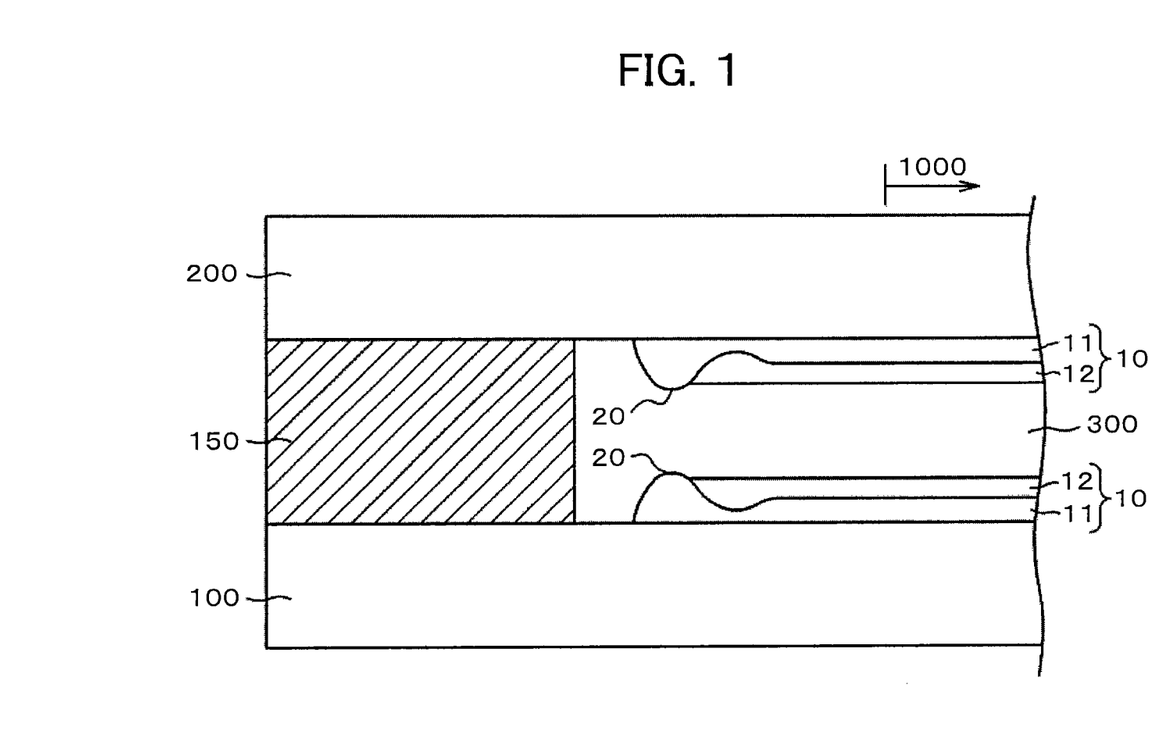
FIG. 1 is a cross-sectional view showing a first embodiment of the present invention.

FIG. 1 is a cross-sectional view of a pixel structure according to the present invention. In FIG. 1, the TFT, scanning lines, video signal lines, and the like formed on the TFT substrate 100 are omitted. Also, the color filters and the like formed in the counter substrate 200 are omitted. In other words, as shown in FIG. 9, one alignment film is formed on the interlayer insulating film or on the pixel electrode on the side of the TFT substrate 100 and the other alignment film is formed on the overcoat film on the counter substrate side, however, these films are omitted in FIG. 1.

In FIG. 1, the TFT substrate 100 and the counter substrate 200 are bonded by a sealing material 150. Then, the liquid crystal layer 300 is interposed between the TFT substrate 100 and the counter substrate 200. The alignment film 10 with a two-layer structure is formed on the inside of the TFT substrate 100 and the counter substrate 200. In FIG. 1, the structure of the alignment film 10 is the same in the TFT substrate 100 and in the counter substrate 200. Thus, the alignment film 10 of the TFT substrate 100 will be described below. Further, the present invention relates to a two-layer structure in which the upper layer is subjected to alignment treatment by means of photo alignment and the lower layer is not subjected to the alignment treatment. However, both of the upper layer and the lower layer are referred to as the alignment film for convenience.

In FIG. 1, the upper alignment film 12, which is brought into contact with the liquid crystal layer 300, is formed on the lower alignment film 11. A raised portion, namely, a hollow 20 is formed in the end portion when the lower alignment film 11 is applied. Then, the end portion of the upper alignment film 12 is determined by the end portion of the lower alignment film 11. In other words, the outer end of the alignment film 10 as a whole is determined by the lower alignment film 11. In FIG. 1, the outer end of the alignment film 10 is present between the end portion of a display area 1000 and the sealing material 150.

Figure 2A:
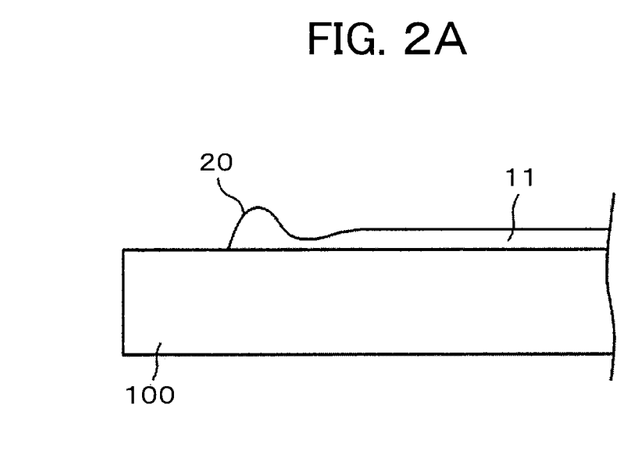
FIGS. 2A and 2B are cross-sectional views showing a method of forming an alignment film according to the present invention.
Figure 2B:
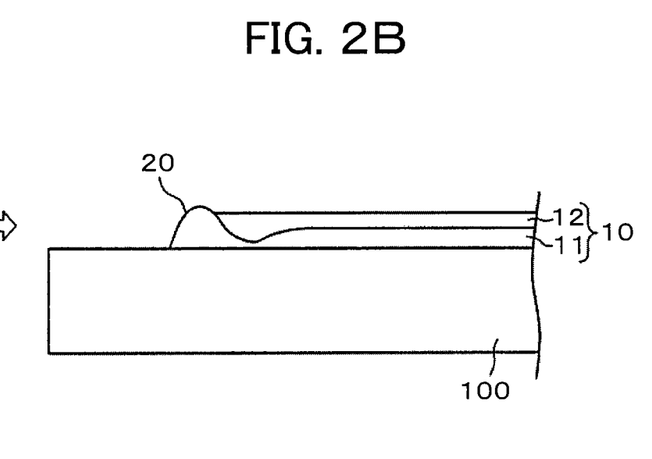

FIGS. 2A and 2B are views showing a method of forming the alignment film 10. FIG. 2A is a cross-sectional view showing the state in which the lower alignment film 11 is applied. In FIG. 2A, a raised portion, namely, a hollow 20 is formed in the end portion of the lower alignment film 11. The application to the lower alignment film 11 is formed by flexographic printing, inkjet, or other printing methods.

The lower alignment film 11 is formed of polyamide acid. The molecular formula of polyamide acid is expressed by Chemical Formula 1.

[Chemical Formula 1]

化1

In Chemical Formula 1, each R2 represents a hydrogen atom, a fluorine atom, a chlorine atom, a bromine atom, a phenyl group, an alkyl group with a carbon number of 1 to 6, an alkoxy group with a carbon number of 1 to 6, a vinyl group (—(CH2)m-CH=CH2, m=0, 1, 2), or an acetyl group (—(CH2)m-C≡CH, m=0, 1, 2), independently, and Ar represents an aromatic compound.

There is no need for the lower alignment film 11 to be subjected to photo alignment, so that Chemical Formula 1 does not contain cyclobutane, but a benzene ring is present instead. Note that the benzene ring is an example, and may be replaced by other groups. Because there is no need for the lower alignment film to be subjected to photo alignment, it is possible to select the viscosity or other application conditions so that the profile the alignment film can easily be controlled. Further, it is possible to set the viscosity or other application conditions so that the height of the hollow in FIG. 2A can be increased.

FIG. 2B is a cross-sectional view showing the state in which the upper alignment film 12 is applied on the lower alignment film 11. The end portion of the upper alignment film 12 is determined by the hollow 20 of the lower alignment film 11. In other words, the hollow 20 in the end portion of the lower alignment film 11 function as a dam to determine the end portion of the upper alignment film 12. More specifically, the end portion of the upper alignment film 12 is determined by the hollow 20 of the end portion of the lower alignment film 11, and is present on the inner side than the hollow, namely, on the display area side. Thus, it is possible to set the components, application conditions, or other conditions of the upper alignment film 12 to conditions most appropriate for the photo alignment treatment.

Chemical Formula 2 is the chemical formula of the polyamide acid ester which is the component of the upper alignment film 12.

[Chemical Formula 2]

化2

In Chemical Formula 2, each R1 represents an alkyl group with a carbon number of 1 to 8 independently, each R2 represents a hydrogen atom, a fluorine atom, a chlorine atom, a bromine atom, a phenyl group, an alkyl group with a carbon number of 1 to 6, an alkoxy group with a carbon number of 1 to 6, a vinyl group (—(CH2)m-CH=CH2, m=0, 1, 2), or an acetyl group (—(CH2)m-CCH, m=0, 1, 2), independently, and Ar represents an aromatic compound.

Note that Chemical Formula 2 is a polyamide acid ester containing cyclobutane, but there also exists a polyamide acid ester not containing cyclobutane. However, of the two polyamide acid esters, the polyamide acid ester containing cyclobutane is the one that can be subjected to photo alignment. Thus, 80% or more of the polyamide acid ester contains cyclobutane.

As described above, the polyamide acid which is the material of the lower alignment film 11 does not contain cyclobutane. On the other hand, the polyamide acid ester which is the material of the upper alignment film 12 contains cyclobutane. The other difference between Chemical Formulas 1 and 2 is that H in Chemical Formula 1 is replaced by R1 in Chemical Formula 2.

FIG. 3 is a flow chart of a process for forming the alignment film 10 shown in FIG. 2. In FIG. 3, the polyamide acid, which is the material of the lower alignment film, is first applied to the substrate. The polyamide acid can be applied by flexographic printing or inkjet printing. Then, the substrate is dried at a temperature of about 150° C. or less. It is possible to set the height or other dimensions of the hollow in FIG. 2A, according to the viscosity of the polyamide acid, the temperature in drying, or the temperature rise profile. Note that it is easy to form the hollow shown in FIG. 2 when the drying temperature is set to 100° C. or less.

Then, the polyamide acid, which is the material of the upper alignment film, is applied on the lower alignment film. Also the polyamide acid ester can be applied by flexographic printing or inkjet printing. The profile of the polyamide acid ester is determined by the hollow formed in the lower alignment film. Thus, it is possible to set the conditions such as viscosity and application conditions that are the most appropriate for photo alignment treatment. After the upper alignment film is applied, the substrate is dried at a temperature of about 150° C.

Figure 4:
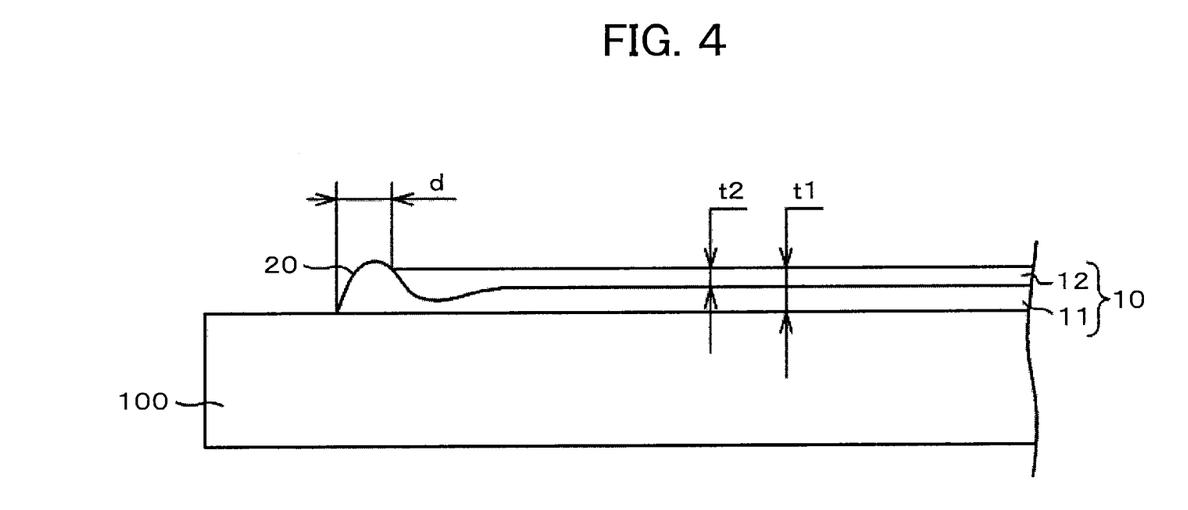
FIG. 4 is a cross-sectional view of an example of the dimensions of the alignment film according to the present invention.

The alignment film of two-layer structure is dried as described above, and then is heated at a temperature of 200 to 250° C. to achieve imidization. FIG. 4 is an example of the dimensions of the alignment film 10 of two-layer structure formed as described above. In FIG. 4, the thickness t1 of the entire alignment film is, for example, 100 nm. Further, the thickness t2 of the upper alignment film 12 is, for example, in the range of 30 to 40 nm. Of these thicknesses, if the film thickness of the upper alignment film 12 is too thin, it can be difficult to continuously form the film due to the irregularities of the lower layer film. In this case, the liquid crystal molecules may not be sufficiently aligned. Thus, it is necessary to ensure a thickness of 30 to 40 nm.

In FIG. 4, in the hollow 20 in the end portion of the lower alignment film 11, the width d of the portion that the upper alignment film 12 does not cover may preferably be, for example, about 0.2 mm. This is because, as described below in FIG. 6, that when the alignment film 10 is formed to the end portion of the substrate 100, the bonding strength is ensured by ensuring the area that the lower alignment film 11 directly contacts somewhere in a portion of the sealing material.

Figure 5:
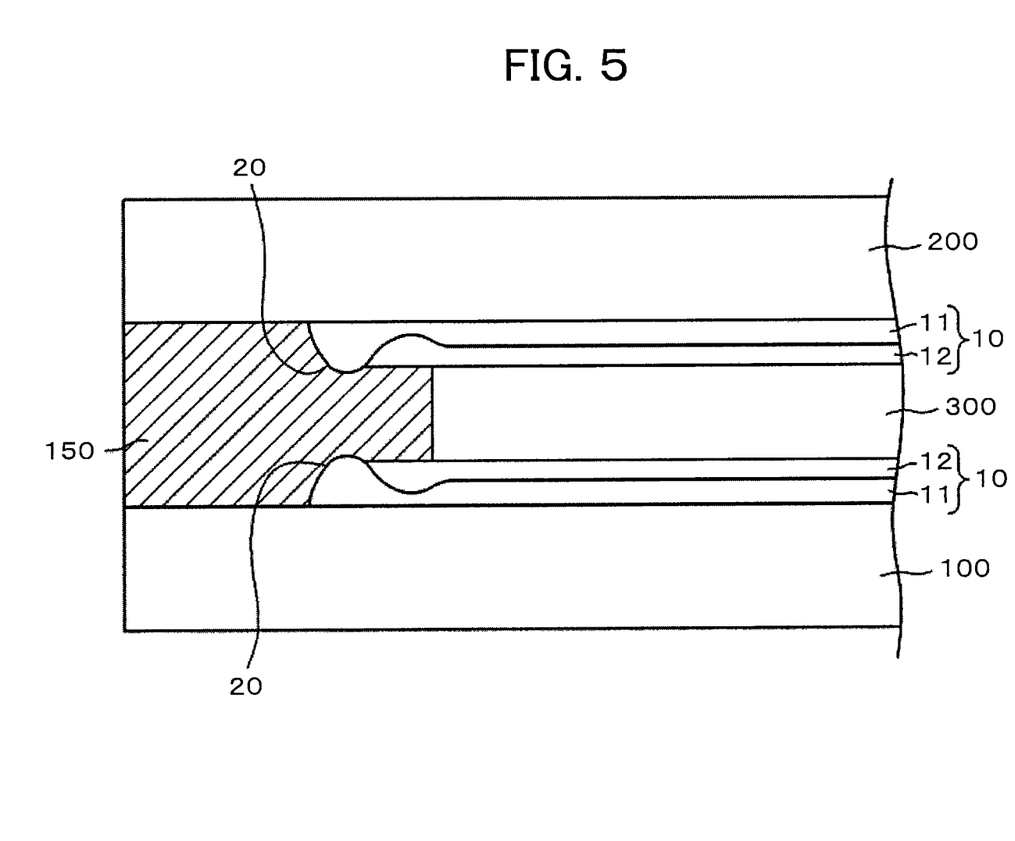
FIG. 5 is a cross-sectional view of another aspect of the present invention.

FIG. 5 is a cross-sectional view showing another aspect of the present invention. When the space between the end portion of the display area and the end portion of the substrate, namely the so-called frame is reduced, it is difficult to configure the end portion of the alignment film between the end portion of the display area and the inner end portion of the sealing material. In this case, the alignment film 10 and the sealing material 150 partially overlap each other. In other words, the end portion of the alignment film 10 is present between the outer and inner ends of the sealing material 150. Also in such a structure, the hollow 20 of the end portion of the lower alignment film 11 can be used to determine the end portion of the upper alignment film 11.

In FIG. 5, the end portion of the lower alignment film 11 is formed within the area of the width of the sealing material 150. Thus, it is necessary to set the viscosity of the material of the lower alignment film 11, as well as the formation process to conditions for easy control of the external dimensions of the lower alignment film 11. According to the present invention, also in this case, there is no need to take into account the photo alignment characteristics with respect to the lower alignment film. Thus, the material, viscosity, dry conditions, or other conditions of the lower alignment film 11 can be set to conditions for easy control of the external dimensions, in which the present invention is advantageous.

Figure 6:
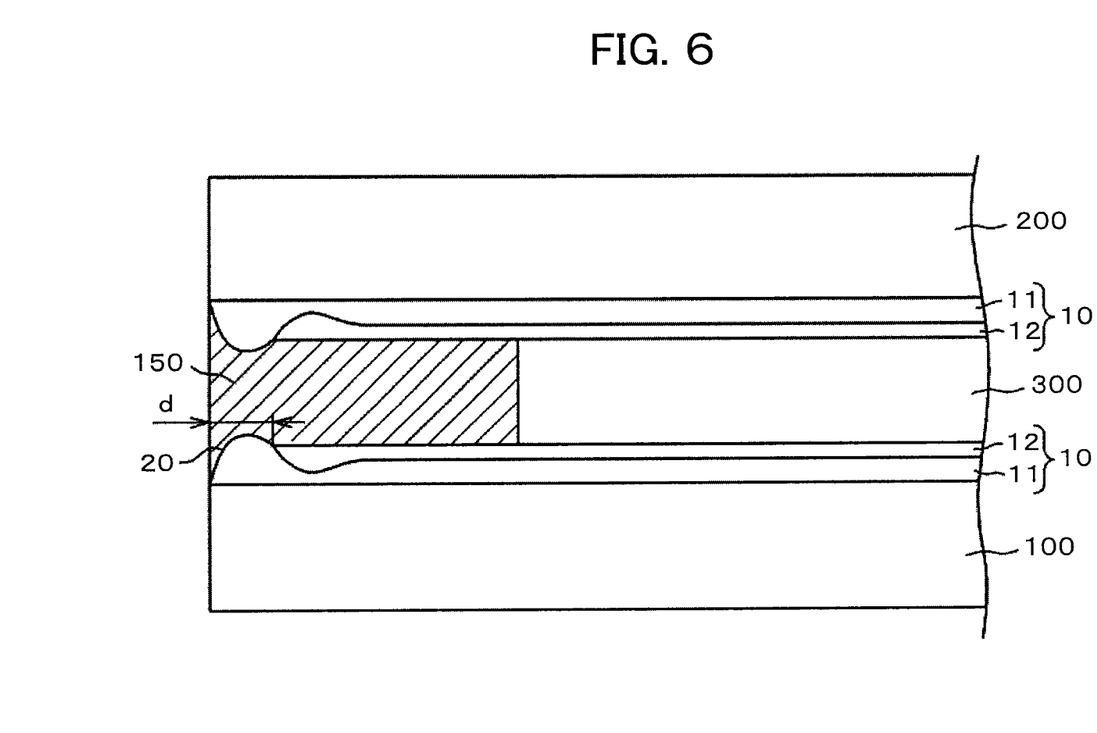
FIG. 6 is a cross-sectional view of still another aspect of the present invention.

FIG. 6 shows the case where the alignment film 10 is formed to the end portion of the substrate. As shown in FIG. 5, even if it is designed to stop the end portion of the alignment film 10 in the middle of the sealing material 150 in the width direction, it is difficult to stop the end portion of the lower alignment film 11 in the middle of the width of the sealing material 150 when the width of the sealing material 150 is reduced. As a result, the alignment film 10 may be formed to the end portion of the substrate. Also in such a case, according to the present invention, the area in which the hollow 20 of the lower alignment film 11 directly contacts the sealing material 150 is formed over the width d as shown in FIG. 6. Thus, it is possible to ensure a minimum bonding strength between the sealing material 150 and the alignment film 10.

Figure 7:
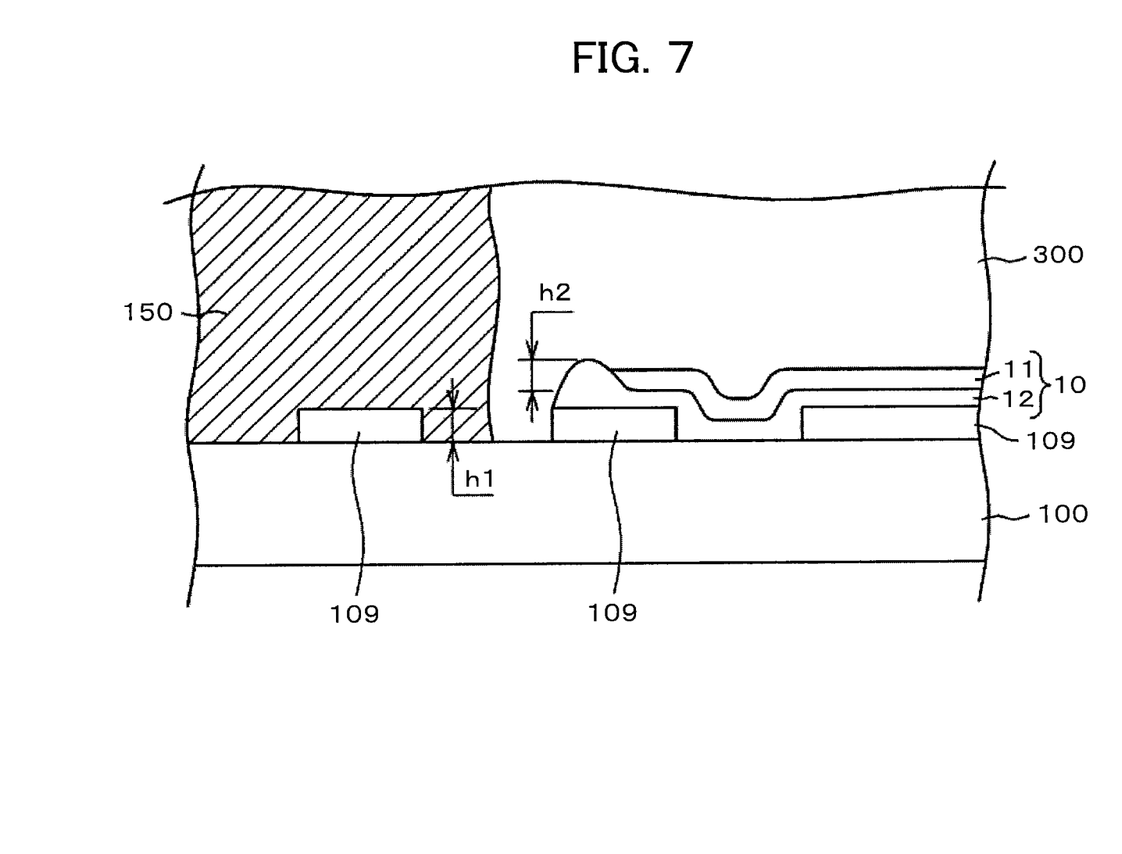
FIG. 7 is a cross-sectional view of still another aspect of the present invention.

FIG. 7 is a cross-sectional view showing still another aspect of the present embodiment. In the description in figures such as FIGS. 1, 5, and 6, it is assumed that a flat film is formed below the lower layer 11. However, the preset invention is also advantageous in the case where the under layer is not a flat film. FIG. 7 shows the case where the present invention is applied to the structure of forming a dam by the interlayer insulation film 109 in the vicinity of the seal portion, in order to prevent the alignment film 10 from overlapping the sealing material 150.

In FIG. 7, irregularities are formed in the vicinity of the seal portion, or in the interlayer insulating film 109 overlapping the seal portion. Then, the irregularities form a dam for the alignment film 10. In the present invention, the lower alignment film 11 is first applied. It is shown the state in which the material of the lower alignment film 11 is blocked by surface tension in the end of the protruding portion of the interlayer insulating film 109.

Also in this case, the hollow 20 is formed in the lower alignment film 11, so that a higher dam is formed in the end portion of the interlayer insulating film 109. In other words, when h1 is the thickness of the interlayer insulating film 109 and h2 is the height of the hollow of the lower alignment film 11, a dam with a height of h1+h2 is formed with respect to the upper alignment film 12. In this way, it is possible to further ensure control of the profile of the upper alignment film 12.

Note that in FIG. 7, the dam is formed by the interlayer insulating film 109. However, it is also possible to form a dam for the alignment film not only by the interlayer insulating film 109, but also by forming irregularities on the ITO of the pixel electrode and the common electrode organic passivation film, the organic passivation film formed in a further lower layer, and the like, to form irregularities on the film of a further upper layer by using the irregularities formed on the lower layer. Further, FIG. 7 shows the structure on the side of the TFT substrate 100, but the structure is the same also on the side of the counter substrate 200. More specifically on the side of the counter substrate 200, the overcoat film 203 and the like form irregularities with respect to the upper alignment film 12 or the lower alignment film 11.

Second Embodiment

Figure 10:
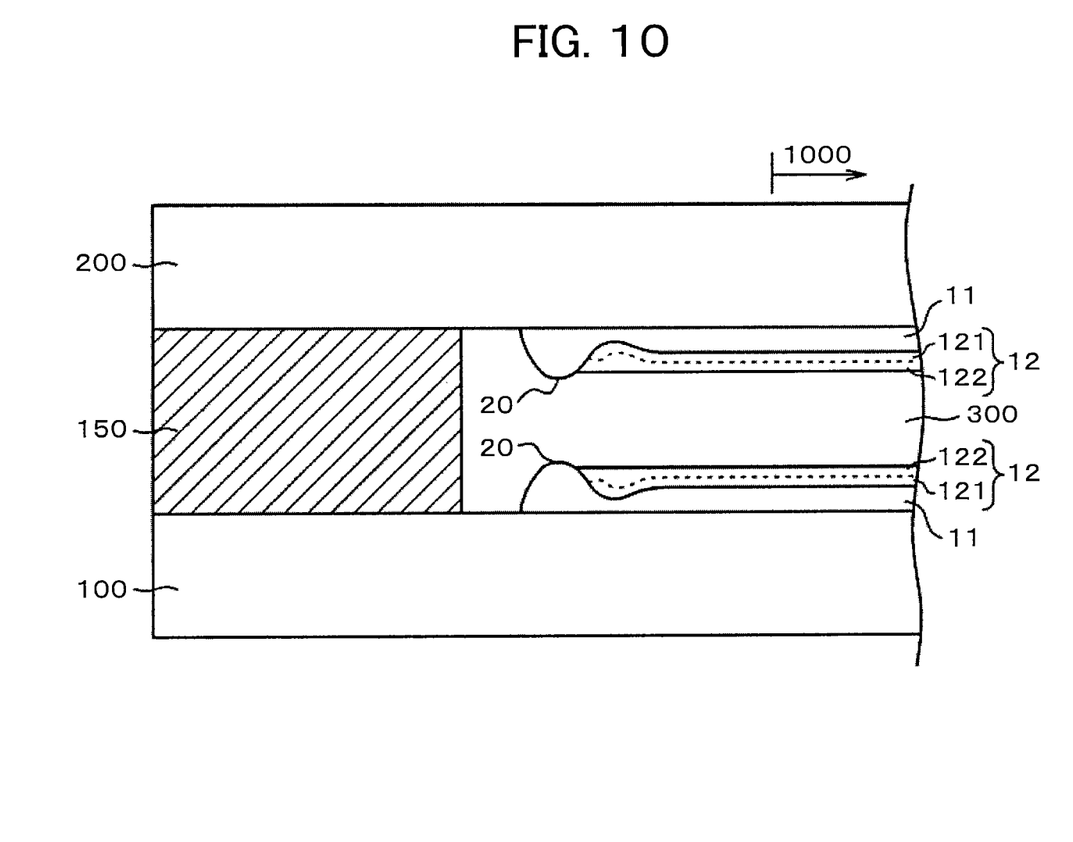
FIG. 10 is a cross-sectional view showing a second embodiment of the present invention.

FIG. 10 is a cross-sectional view in the vicinity of the seal portion of the liquid crystal display device showing the present embodiment. FIG. 10 is different from FIG. 1 in the first embodiment in that the lower alignment film 11 is the alignment film using polyamide acid and that the upper alignment film 12 is applied with a mixture of polyamide acid and polyamide acid ester to cause layer separation. As a result, a second alignment film 122 of polyamide acid ester is formed in the upper layer of the upper alignment film 12 that contacts the liquid crystal of the upper alignment film 12, and a first alignment film 121 of polyamide acid is formed in the lower layer of the upper alignment film 12 that contacts the lower alignment film 11. In this way, the upper alignment film 12 has a two-layer structure due to layer separation, so that the boundary is not clear. Thus, in FIG. 10, the boundary between the second alignment film 122 on the upper side and the first alignment film 121 on the lower side is shown by the dotted lines.

In FIG. 10, similarly to the first embodiment, the material, viscosity, process conditions or other conditions of the polyamide acid, which is used as the lower alignment film 11, are set so that the hollow can easily be formed in the end portion. Further, with respect to the mixture of polyamide acid and polyamide acid ester of the upper layer, it is possible to select the material composition or process conditions so that the upper alignment film 12 can easily be subjected to photo alignment. In this case, the upper alignment film 12 has a structure in which the second alignment film 122 on the upper side is formed of polyamide acid ester and the first alignment film 121 on the lower side is formed of polyamide acid. Thus, the alignment film has a three-layer structure as a whole.

However, in this case, the concentration of the polyamide acid ester is increased from the lower side to the upper side in the upper alignment film 12. In other words, the upper alignment film 12 has a concentration gradient of the polyamide acid ester in the direction of the film thickness. Other structures are the same as those in the structures described in FIGS. 1 to 7.

Also in such a structure of the present embodiment, it is possible to control the profile of the upper alignment film 12 that is subjected to photo alignment more accurately, by setting the material or process conditions of the lower alignment film 11 so that necessary hollow can easily be formed. Thus, it is possible to achieve a liquid crystal display device with excellent alignment stability and high reliability of the seal portion.

As for the alignment film described above, it is assumed that the lower alignment film is the alignment film formed of polyamide acid as a precursor, and the upper alignment film is the alignment film formed of polyamide acid ester as a precursor. However, the lower and upper alignment films are not limited to this example. The present invention can be applied to the alignment film in which the upper alignment film is an alignment film subjected to photo alignment and the lower alignment film is an alignment film not subjected to photo alignment.

The above description has focused on the structure of the IPS mode liquid crystal display device in which the alignment film is subjected to photo alignment treatment. However, the present invention can also be applied to other types of liquid crystal display devices with the alignment film being subjected to photo alignment treatment.

Further, the alignment film according to the present invention can also be applied to both the alignment film on the TFT substrate side and the alignment film on the counter substrate. However, the present invention may also be applied to the alignment film only on the TFT substrate side or on the counter substrate side.

What is claimed is:

1. A liquid crystal display device comprising:
   a TFT substrate including a display area with pixels arranged in a matrix form, each pixel including a pixel electrode and a TFT, in which an alignment film is formed;
   a counter substrate disposed opposite the TFT substrate; and
   a liquid crystal interposed between the TFT substrate and the counter substrate,
   wherein the alignment film includes a lower alignment film and an upper alignment film that is stacked on the lower alignment film and contacts with the liquid crystal,
   wherein the upper alignment film is subjected to photo alignment treatment,
   wherein a material of the lower alignment film and a material of the upper alignment film are polyimide,
   wherein a bulge with an increased film thickness is formed at an end portion of the lower alignment film, and
   wherein an end portion of the upper alignment film is present on a side closer to the display area than the bulge of the lower alignment film.

2. The liquid crystal display device according to claim 1, wherein the end portion of the lower alignment film is present between the display area and a sealing material.

3. The liquid crystal display device according to claim 1, wherein the end portion of the lower alignment film is present between outer and inner ends of a sealing material.

4. The liquid crystal display device according to claim 1, wherein the end portion of the lower alignment film is formed to an end portion of the TFT substrate or the counter substrate.

5. The liquid crystal display device according to claim 1, wherein a film below the lower alignment film has a thinner portion, and
   wherein the lower alignment film is formed on the thinner portion.

6. The liquid crystal display device according to claim 1, wherein the lower alignment film does not contribute to the alignment of the liquid crystal.

7. A liquid crystal display device comprising:
   a TFT substrate including a display area with pixels arranged in a matrix form, each pixel including a pixel electrode and a TFT, in which an alignment film is formed;
   a counter substrate disposed opposite the TFT substrate; and
   a liquid crystal interposed between the TFT substrate and the counter substrate,
   wherein the alignment film includes a lower alignment film and an upper alignment film that is formed on the lower alignment film and contacts with the liquid crystal,
   wherein the upper alignment film includes a first alignment film contacting the lower alignment film and a second alignment film contacting the liquid crystal,
   wherein the second alignment film of the upper alignment film is not subjected to photo alignment treatment, and the first alignment film of the upper alignment film does not contribute to the alignment of the liquid crystal,
   wherein the lower alignment film does not contribute to the alignment of the liquid crystal,
   wherein a material of the lower alignment film and a material of the upper alignment film are polyimide,
   wherein a bulge with an increased film thickness is formed at an end portion of the lower alignment film, and
   wherein an end portion of the upper alignment film is determined by the bulge of the lower alignment film.

8. The liquid crystal display device according to claim 7, wherein the material of the second alignment film of the upper alignment film has a concentration gradient in the film thickness direction of the upper alignment film.

* * * * *